(No Model.) 4 Sheets—Sheet 1.

B. D. ADAMS.
CASH RECORDER.

No. 467,711. Patented Jan. 26, 1892.

WITNESSES:

INVENTOR

ATTORNEY (No Model.) 4 Sheets—Sheet 2.

B. D. ADAMS.
CASH RECORDER.

No. 467,711. Patented Jan. 26, 1892.

WITNESSES:
M. J. Spencer
Henry B. Anderson

INVENTOR
Benjamin D. Adams
BY
Henry F. Parker
ATTORNEY

THE NORRIS PETERS CO., PHOTO-LITHO., WASHINGTON, D. C.

(No Model.) 4 Sheets—Sheet 3.

B. D. ADAMS.
CASH RECORDER.

No. 467,711. Patented Jan. 26, 1892.

WITNESSES:
M. J. Spencer
Henry B. Anderson

INVENTOR
Benjamin D. Adams
BY
Henry F. Parker
ATTORNEY (No Model.) 4 Sheets—Sheet 4.
B. D. ADAMS.
CASH RECORDER.
No. 467,711. Patented Jan. 26, 1892.
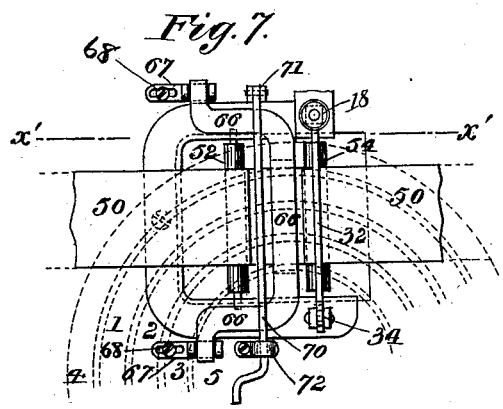
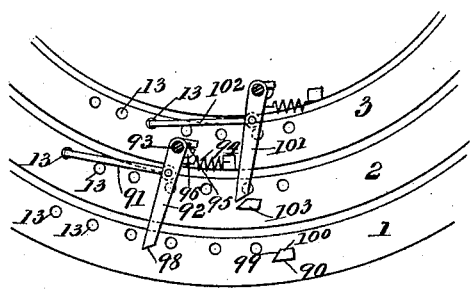
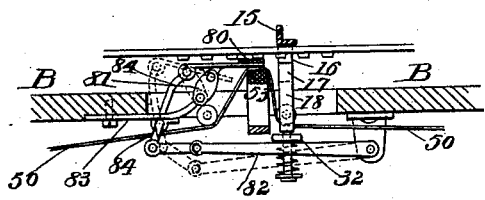
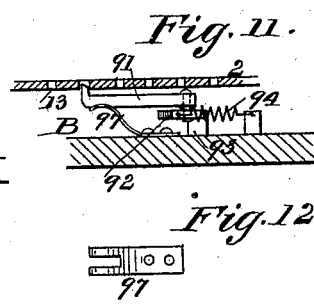
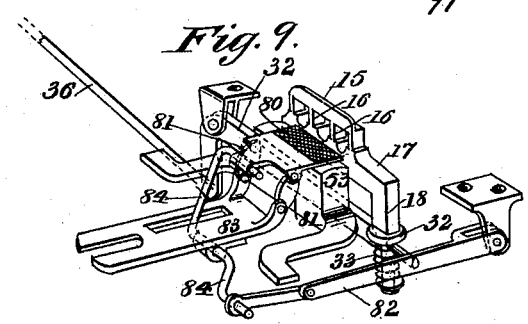
WITNESSES:
M. J. Spencer
Henry B. Anderson
INVENTOR
Benjamin D. Adams.
BY
Henry F. Parker.
ATTORNEY
THE NORRIS PETERS CO., PHOTO-LITHO., WASHINGTON, D. C.

UNITED STATES PATENT OFFICE.

BENJAMIN D. ADAMS, OF GRINNELL, IOWA, ASSIGNOR TO SARAH P. ADAMS, OF SAME PLACE.

CASH-RECORDER.

SPECIFICATION forming part of Letters Patent No. 467,711, dated January 26, 1892.

Application filed July 1, 1891. Serial No. 398,131. (No model.)

*To all whom it may concern:*

Be it known that I, BENJAMIN D. ADAMS, a citizen of the United States, residing at Grinnell, Poweshiek county, Iowa, have invented a certain new and Improved Cash-Recorder, of which the following is a specification.

My invention relates to those machines used for automatically accounting for sales and indicating the aggregate at each time the machine is operated.

The object of my invention is to provide a simple and concentrated mechanism for performing the said functions; and it consists in a combined cash-drawer, printing mechanism, and selecting device, each co-operating automatically with one another in the manner hereinafter described in detail, and pointed out in the appended claims.

Figure 1:
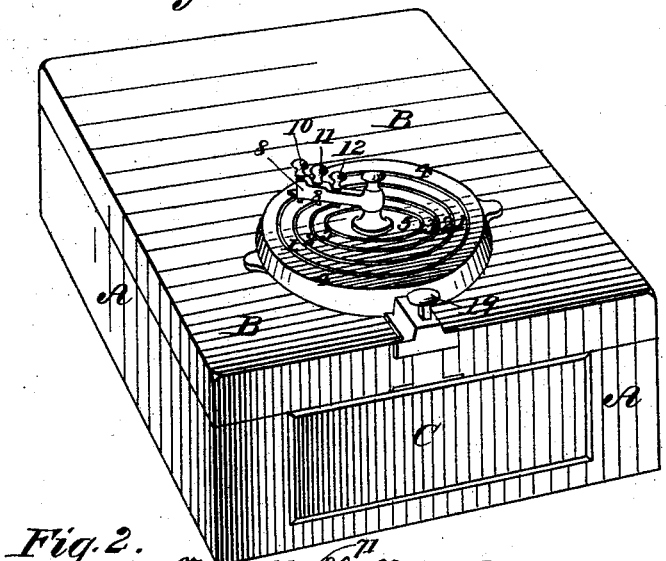
Figure 2:
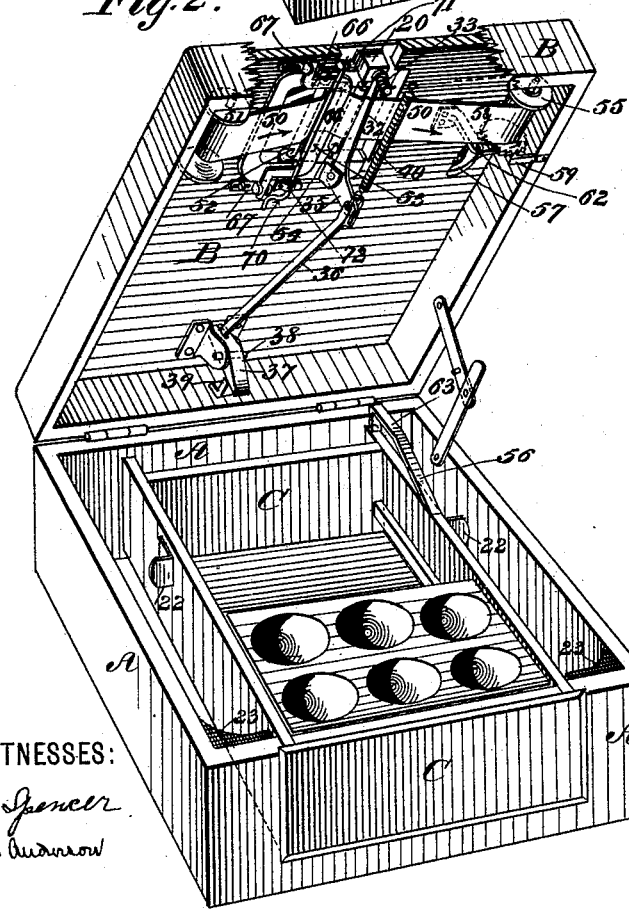
Figure 3:
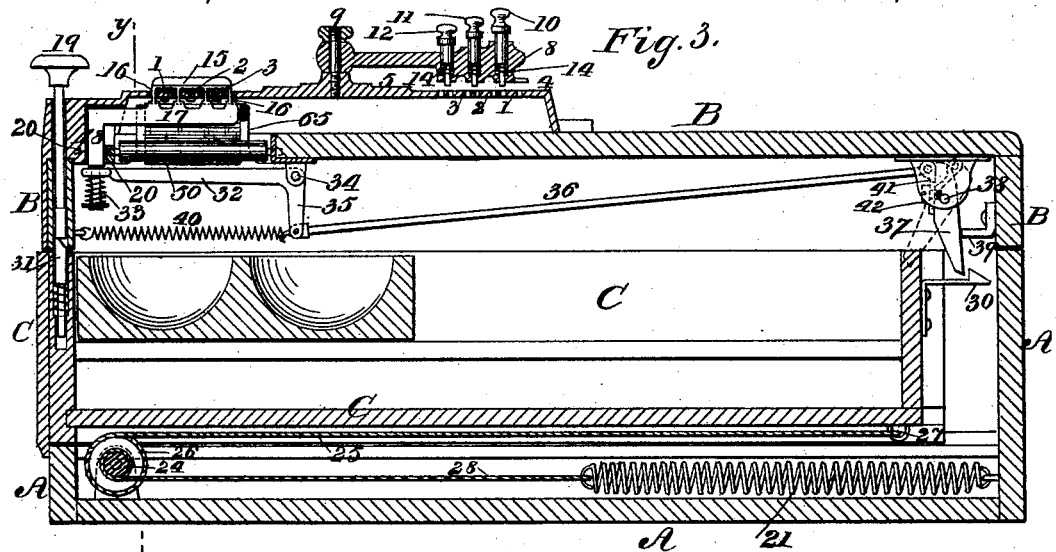
Figure 4:
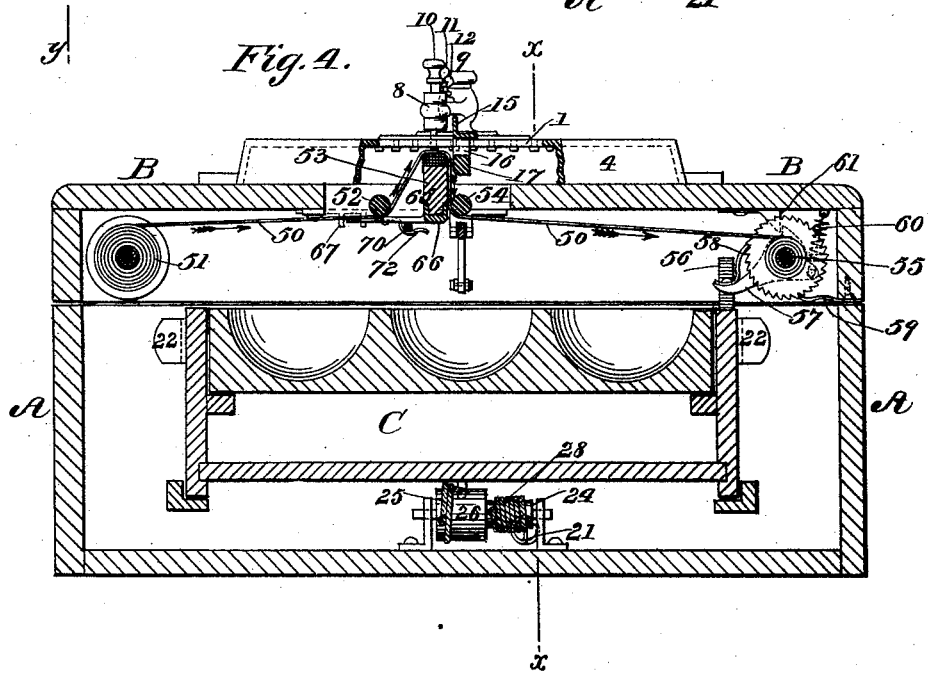
Figure 5:
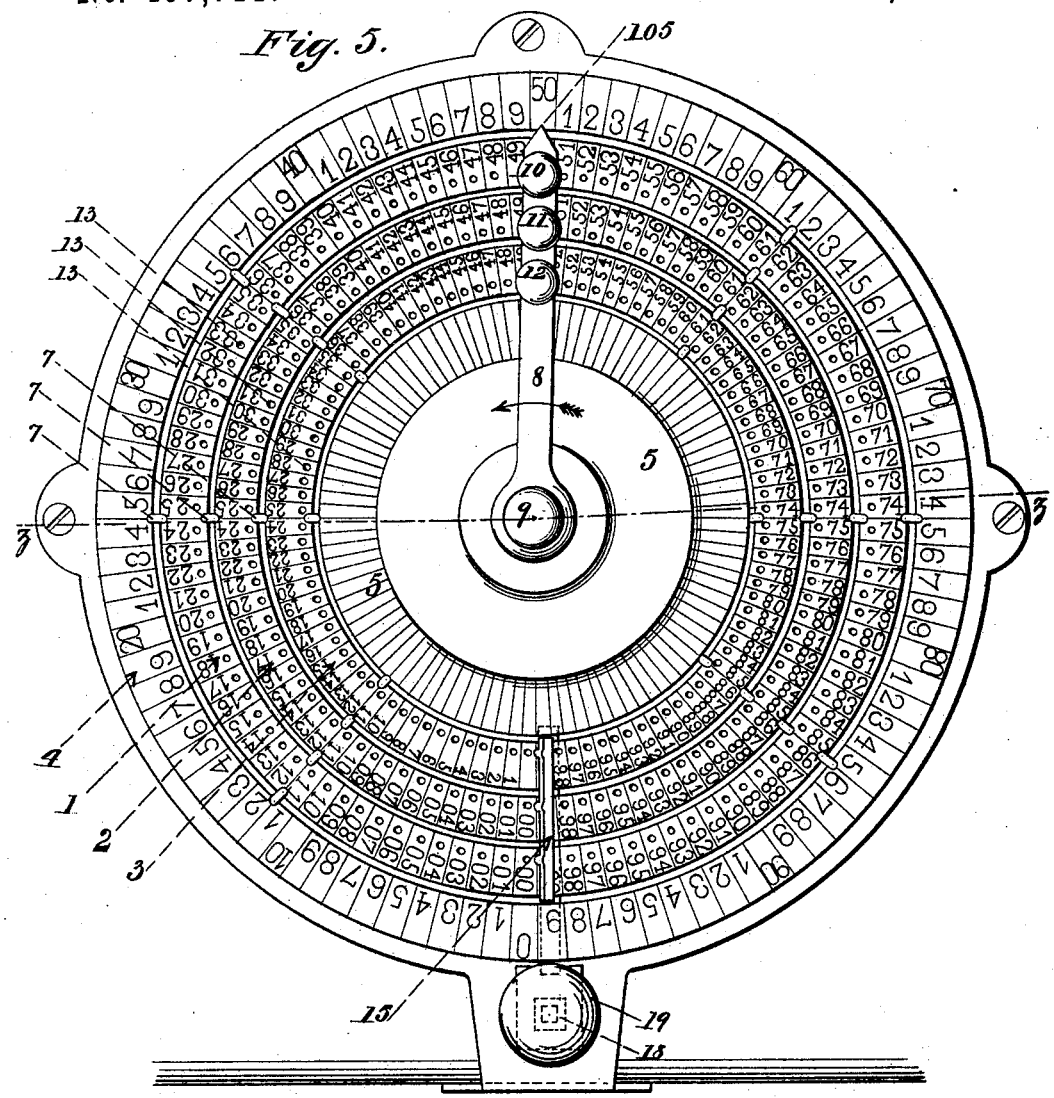

Referring to the accompanying drawings, Figure 1 represents a perspective view of my invention embodied in the form of a box; Fig. 2, a similar view, representing the lid of the box raised and partly broken away, showing the interior construction; Fig. 3, an enlarged longitudinal section taken on the line *x x*, Fig. 4; and Fig. 4, a cross-section of Fig. 3, taken on the line *y y*. Fig. 5 is an enlarged plan view of the dial apparatus; and Fig. 6, a cross-section of Fig. 5, taken on the line *z z*. Fig. 7 is an enlarged detail view drawn on the same scale as Figs. 3 and 4, comprising an inverted plan view of the printing mechanism beneath the lid of the box. Fig. 8 is a cross-section of Fig. 7, taken on the line *x' x'*, illustrating a modification of the printing mechanism, and Fig. 9 a perspective view of the same, omitting the lid of the box. Fig. 10 is an inverted view of the type-rings of the machine, showing in detail one suitable device for moving one ring a fractional part of its rotation at each time of a complete rotation of another ring. Fig. 11 is an edge view of the mechanism shown in Fig. 10, and Fig. 12 a detail view pertaining to said Figs. 10 and 11.

My invention comprises more particularly a series of type-rings bearing indicating-numbers on their upper surface and printing-types on their lower surface, and a selecting device for moving any of the desired numbers into coincidence with the impression line over the paper or other surface for receiving the impressions, and also of other mechanism for opening the cash-drawer automatically and producing the impression by the momentum of the drawer, and also actuating the paper web which receives impressions by the motion of the drawer.

A in the several figures indicates the body of the box, B the lid, and C the drawer.

The movable rings 1, 2, and 3, respectively, indicate units and tens of cents, units and tens of dollars, and hundreds and thousands thereof. Each ring is movable independently at will and in the direction opposite the progression of numbers thereon, excepting when a ring bearing lower denominations has completed a revolution, at which time such ring automatically moves the adjacent ring of next higher denomination one space, while the said first ring recommences its rotation, thus maintaining a correct account.

Each ring 1, 2, and 3 is subdivided, as as clearly shown in Fig. 5, into one hundred equal spaces severally designated by consecutive numbers from 1 to 00. The outer ring margin 4 of the dial is similarly subdivided, the notation illustrated, however, being different for convenience of quick selection, namely, into two series, first, of 10, 20, 30, 40, &c., and, second, of 1, 2, 3, 4, &c., as subdivisions of each said first series. The outer margin or stationary ring 4 is secured to the lid B of the box, as represented, and comprises the selecting index, no other figures being read in the act of selection except those in this outer margin or ring.

Figure 6:
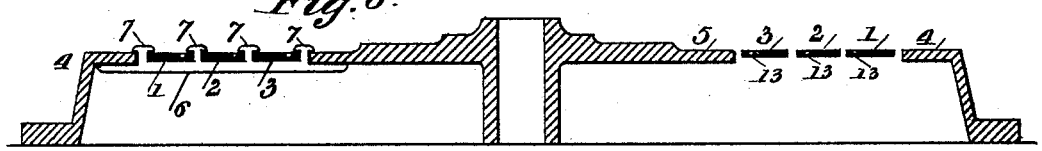

5 is a central stationary plate also secured to the lid of the box, as indicated in Fig. 6, and the rings 1, 2, and 3, concentrically located between the outer margin 4 and the inner plate 5 of the dial, are supported upon radial ribs 6, having studs 7, which project between the movable rings, and being provided with suitable heads retain the same in position.

The rings 1, 2, and 3 are flexible, admitting of a certain amount of compression, and their under surfaces bear the imprinting-type corresponding in location to the numbers upon their upper surfaces, so that when pressure is brought to bear upon these flexible rings at the compression-point the numbers will be registered upon the paper beneath, the mechanism for producing this compression being hereinafter more fully described. Each ring 1, 2, and 3 is also provided with a series of perforations 13 opposite each number, and there is an index-arm 8, pivoted at 9 in the center plate 5, which is freely movable in any direction. This index-arm is moved with reference to the figures upon the stationary marginal ring 4. The arm 8 contains independent selecting-pins 10 11 12 corresponding, respectively, to the rings 1, 2, and 3, and these selecting-pins have their upper ends located at different heights for convenience of independent access, and bear at their lower ends points or projections of a proper size to enter the perforations 13, and these selecting-pins have springs 14, as indicated in sectional view in Fig. 3, whereby they retract when released.

15 is a combined stop and impression-bar for arresting the index-arm 8 at the proper point after the selection is made and the rings 1, 2, and 3 brought into the preparatory position for printing.

Referring now more particularly to Figs. 2, 3, 4, and 7, the impression mechanism consists as follows: The bar 15 is connected by studs or suitable standards 16, projecting between the movable rings to the depression-bar 17 beneath them, which depression-bar is rigid with and forms a part of the vertical slide 18, which is to be depressed to produce the act of printing after the types have been brought into position. The slide 18 is fitted in the bearing 20, so as to move freely in a vertical direction, but maintain its vertical position and the horizontal position of the bar 17 rigidly.

The drawer C is opened by the depression of the key 19, and the movement of the drawer subsequently caused to produce the impression by means of the following mechanism: The drawer C is provided with a tension-spring 21 for throwing it open forcibly, and with studs 22, (appearing in Fig. 2,) which strike upon india-rubber or other cushions 23. The force of the spring 21 is imparted to the drawer C by means of the cord 28, which is wound upon a small roller 24 and the cord 25, which is wound upon a larger roller 26, revolving with the roller 24, the said cord 25 having connection to the drawer at its rear end, as shown at 27. Thus a multiplied motion is obtained whereby a small movement of the spring 21 will impart the necessary long stroke to the drawer. At the back of the drawer C a spring-catch 30 is provided, which engages with the lever 37 when the drawer is closed. At the lower end of the depressing-bar 18 a bell-crank lever 32 is connected through the interposition of the spring 33. The lever 32 is pivoted at 34, and its depending end 35 is attached to the connecting-rod 36, extending to the rear of the case, where it is attached to the rock-arm 37, pivoted at 38.

39 is a stop for limiting the motion of the rock-arm 37, and 40 is a spring for sustaining the lever 32 and impression-bar in their uppermost position. When the key 19 is depressed, it disengages the drawer-latch 31 and releases the drawer, the spring 21 operating, as above described, to throw it open. The projecting tooth of the catch 30 strikes the lower end of the arm 37 as the drawer advances, and the power of the spring 21 being greater than that of spring 40 carries the bar 18 and impression-plate 15 downward as far as it will go, making the impression and cushioning the same by the yielding action of the spring 33, interposed between the lever 32 and the compression-bar 18, and when the rock-arm 37 has moved to the angular position indicated by dotted lines in Fig. 3 the catch 30 slips away therefrom, permitting the continued progress of the drawer to its full opening stroke. The attachment of the rod 36 to the rock-arm is readily adjustable through the slotted plate 41 and screw 42, so as to vary the stroke of impression and leverage of the drawer upon the printing mechanism.

The impressions are made upon a web of paper 50, which is intermittently fed by the outward motion of the drawer subsequent to each act of impression.

The mechanism for carrying and moving the paper web 50 consists as follows: The paper is originally wound upon a reel 51 and passes beneath a roller 52 over the impression-pad 53, as clearly indicated in Fig. 4, and then under the roller 54 and to the winding-reel 55. The winding-reel 55 is actuated to draw the paper along by means of an inclined ridge 56 upon one side of the drawer and a pawl mechanism 57 upon the reel 55, having any suitable construction. In that illustrated the pawl-arm 57 is pivoted to the axis of the wheel, and the pawl 58 consists of a spring engaging with the ratchet-teeth upon the wheel of the reel. A stationary pawl 59 secures the position of the wheel at each advancement. The spring 60 returns the pawl-arm 57 to its lowest or normal position, in which it is arrested by the stop 61, attached to the lid of the box. The height of the ridge 56 on the drawer may be variably adjusted to vary the travel of the paper as may be desired. Another construction of pawl mechanism is illustrated in Fig. 2, in which a hooked pawl 58, having a suitable spring, is employed in conjunction with the stationary hooked pawl 59. A similar action of the ridge 56 occurs upon the arm 57, pivoted at 62 upon the standard within the lid of the box instead of upon the axis of the reel, and an opposite direction of rotation of the latter is thereby acquired, the paper being wound upon the lower side of the reel instead of upon the upper side, which modification also appears with reference to the reel 51 in said Fig. 2. It will also be seen in Fig. 2 that by the location of the reel-actuating pawl in the front portion of the box-lid the incline 56 acts thereon at the final portion of the drawer-opening stroke, and the pawl passes onto the flat surface 63 of the ridge 56 at the termination of the stroke, but not passing over said surface nor resuming its normal position until the drawer is again pushed back by hand.

The impression-pad 53 is supported upon a block 65, which projects upward from the impression-bed 66, appearing more clearly in Fig. 7, and this impression-bed is adjustable in the direction of the circumference of the type-rings by means of the slotted holding-pieces 67, carrying the shanks of said bar and secured in their adjusted position by means of screws 68. The impression-block and its bed 66 is also supported vertically in opposition to the depression of the types by means of a transverse rod 70, pivoted at 71 and held beneath a clasp 72. The bar 70 may be readily released from the clasp 72 by a side motion and then raised and swung away from the arms of the bar 66, releasing the same when it is desired to change the paper.

The impressions of the types may be made by embossing the paper in the use of the mechanism thus far described, or such impression may be made by inking the types by means of a suitable pad, roller, or ribbon, such as well-known to the art, adapted in any suitable manner to the foregoing parts. One adaptation—namely, that of an inking-pad—I illustrate in Figs. 8 and 9, and this consists in the pad 80, which advances into contact with the types when the impression-bar 17 is released and rises to its normal position, said pad 80 retracting from its inking-position between the types and the impression-pad when such bar is depressed. To this purpose the pad 80 is supported on links 81 at either end, so as to impart a parallel motion, and a rock-arm 84 is connected by a pivoted bar 82 to the depressing-bar 32, as clearly seen in said Figs. 8 and 9, and by their angular motions with reference to one another said connections throw the inking-pad into the position indicated by dotted lines in Fig. 8 when said bar 17 is thrust downward and immediately before the types have contact with the paper upon the pad 53. The links 81 are pivoted to a suitable supporting-plate 83, adjustably attached to the lid of the box to afford a proper adjustment of the inking-pad.

In lieu of the inking-pad 53, such as described, I may employ a carbon ribbon operated on reels situated at any suitable point between the reels 51 and 55, and above the paper, so as to pass between the same and the type, such mode of winding of said paper as that illustrated in Fig. 2 being adapted to provide room for the placing of the ribbon-reels. The ribbon-reels can then be operated by a pawl mechanism and projecting ridge on the drawer corresponding to that 57 and 56, hereinbefore described with reference to the paper.

The automatic device for imparting the fractional rotative movement to a ring of higher denomination at each complete rotation of a ring of lower denomination, and illustrated in Figs. 10, 11, and 12, consists as follows: The ring 1 bears a stud or projection 90, and with the perforations of the ring 2 a pawl 91 engages, said pawl being carried upon an arm 92, pivoted at 93 on a stud projecting from the upper surface of the lid of the box beneath the rings. A spring 94, attached to the arm 92, retracts the same, together with its pawl 91, and its retracted position is limited by the stop 95, projecting from the said stud 93, engaging with a spur or heel 96 on the pawl-arm 92. A spring 97, constructed as in Fig. 12, and attached to the lid of the box, as seen on Fig. 11, serves to maintain the pawl 91 upward, causing it to enter the successive perforations and to maintain alignment therewith. As the ring 1, for instance, rotates, it will be seen that the depending stud 90 strikes upon the beveled edge 98 of the arm 92, advancing the same, together with the ring 2, engaged by the pawl thereof. When the ring 2 has been moved the distance of one space, the beveled edge 98 passes from the beveled edge 99 of the stud 90 upon a free surface 100 thereof, ceasing to move the ring 2, the arm 92 and its pawl retracting to its normal position as the stud 90 passes out of contact therewith. The same description applies to the arm 101 and its pawl 102, actuating the ring 3 by means of the stud 103 on the ring 2. Thus when the ring 1 has made nearly a complete rotation or ninety-nine spaces, the one hundredth fractional rotation thereof causes the ring 2 to move one rotation, changing the types in the necessary manner to imprint the proper total, and when said ring 2 has automatically or otherwise completed ninety-nine spaces of its rotation the one hundredth fractional movement thereof similarly actuates the ring 3 the distance of one space.

The operation of my invention is as follows: The several type-rings 1, 2, and 3 being at their initial position in which 00 appears on each opposite the bar 15 and immediately over the impression-pad 53 of the machine and a sale of any specific amount of dollars and cents which it is desired to have registered being made, the index-arm is moved to any part of the dial and the denomination of cents is selected first, the selecting-pin 10 being used for this purpose. When the pointer 105 is opposite the desired units and tens of cents, this pin 10 is depressed into the perforation of the ring 1, lying radially opposite such number on the stationary ring 4 and kept so depressed while the index-arm 8 is moved in the direction of the arrow in Fig. 5 to its limiting-stop 15. Should the amount of the sale not exceed ninety-nine cents, the printing may now be performed by the depression of the key 19. If it exceeds ninety-nine cents, the index-arm 8 is, before such depression of the key 19 is made, again moved about the selecting-scale 4 until its pointer 105 is brought to the number thereon corresponding with the number of dollars to be recorded. The selecting-pin 11 is then depressed, engaging with the perforations of the ring 2 in radial line with the selected number on the index-ring and the operation repeated in the manner hereinbefore described with reference to the selection of cents, the index-arm being again brought against the stop 15 and the key 19 then depressed. Should the amount of sales exceed ninety-nine dollars and ninety-nine cents, the operation is repeated a third time with reference to the same scale 4, but using the selecting-pin 12 to act upon the ring 3 and bring its types into proper position preparatory to depressing the key 19.

It will thus be seen that each printing operation will record the aggregate amount of cash received, and that the specific amount of any particular sale may be ascertained by computation, simply subtracting the registered amount of the preceding sale from the record of the sale in question.

Having thus fully described my invention, what I claim, and desire to secure by Letters Patent, is—

1. In a cash-recording machine, the combination of a rotary type-ring bearing consecutive numbers, a stationary annular selecting-scale concentric with said ring, an index-arm independently movable over said scale, having a latch to engage or disengage with the type-ring at any point, and a stop for arresting the index-arm at the initial point of the selecting-scale, whereby the numbered types upon the movable ring may be advanced successively in one direction at will by the said index-arm and impressions registered upon the paper that represent the aggregate amount including that registered by preceding impressions, substantially as and for the purposes described.

2. In a cash-recording machine, the combination of a plurality of concentric type-rings, a stationary annular selecting-scale and index-arm, mechanism for engaging the arm with any of the rings at will and rotating the same therewith, and mechanism for imparting the impression of the types upon the paper opposite the initial point of the selecting-scale.

3. In a cash-recording machine, the combination of a plurality of concentric type-rings, perforations or notches therein opposite the several types, a stationary annular selecting-scale concentric with the rings, an index-arm moving over the said scale, independent selecting-pins in the said arm engaging with said perforations or notches, and means, substantially as described, for imparting the impression to the paper from the types that are in radial line with the initial point of the selecting-scale.

4. In a cash-recording machine, the combination of a series of annular type-rings concentrically arranged and independently movable, a stationary scale and index-arm moving over the scale, means for engaging the arm with the rings, a stop for limiting the movement of the arm at the initial point in the circumference of the scale, and an impression-bar for depressing the type on all the rings at said initial point of the scale, and a key for operating the bar.

5. In a cash-recording machine, the combination, with the plurality of annular movable type-rings and the selecting-scale, of an impression-bar common to all of the said type-rings opposite the given point of the scale, and the impression-pad adjacent the said bar opposite the types on the several rings, and a web of paper passing over the pad, and reels for carrying the web.

6. In a cash-recording machine, the combination of the movable type-rings, and the impression-bar, a spring-actuated cash-drawer, mechanism connecting the same to said bar, a latch for retaining the drawer in its closed position, and a key for tripping the said latch.

7. In a cash-recording machine, the combination of the movable type-rings, the impression-bar, the impression-pad, the web of paper and reels therefor, the spring-actuated cash-drawer, its retaining-latch, a key for tripping the latch, a pawl-and-ratchet mechanism for operating the paper-reels, and a cam upon the drawer for operating the said pawl mechanism and imparting an intermittent feed to the paper after each act of printing.

BENJAMIN D. ADAMS.

Witnesses:
CHAS. E. WALKER,
C. W. H. BEYER.